Patented Oct. 8, 1929

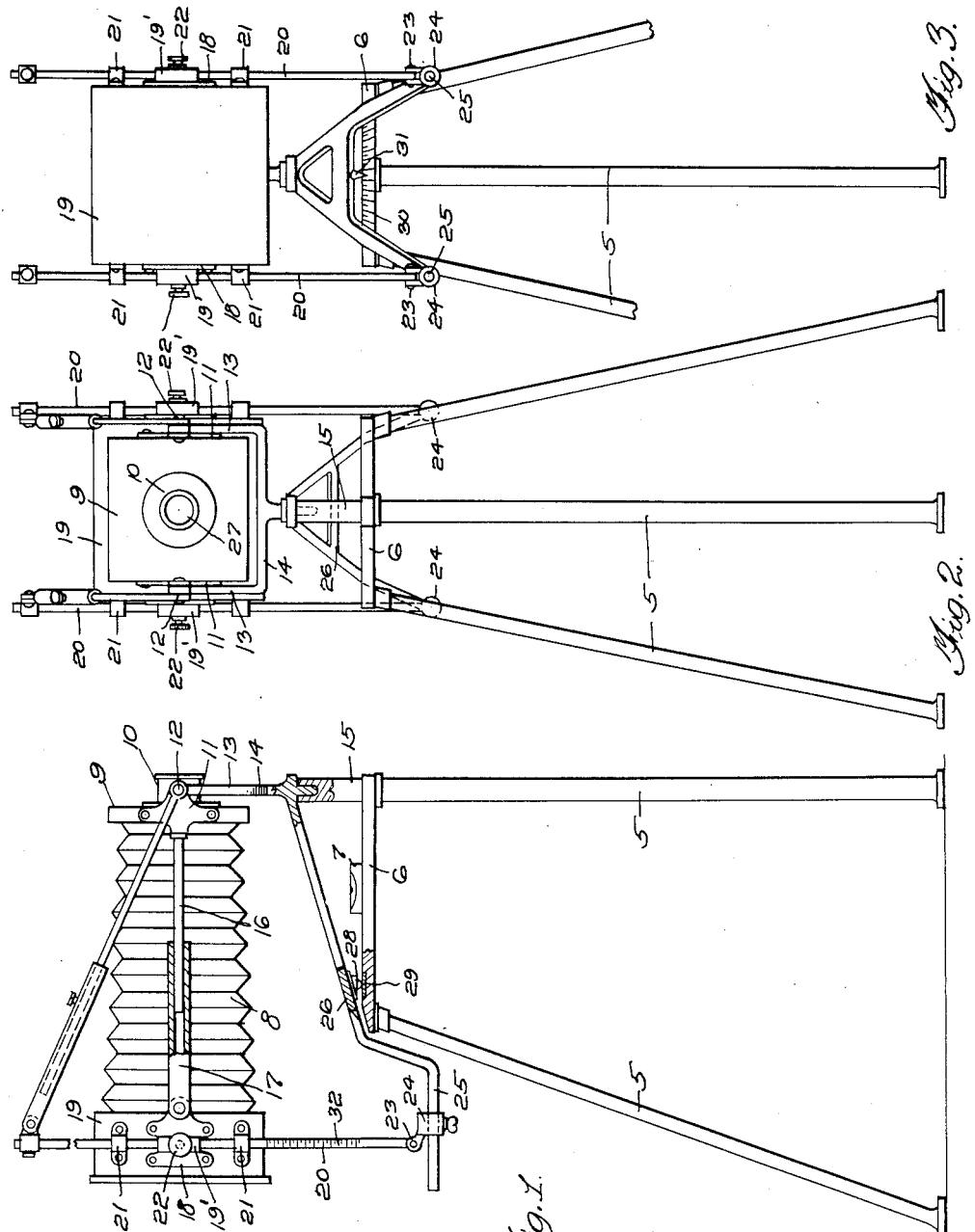

1,730,346

UNITED STATES PATENT OFFICE

LORING W. BEESON AND JOHN A. BEESON, OF VIRGINIA HIGHLANDS, VIRGINIA

CAMERA

Application filed October 1, 1928. Serial No. 309,436.

This invention relates to cameras, and it has for its object to provide a camera, and a mounting therefor, of a simple and economical nature, by means of which large photographs may be taken in sections, thus rendering it possible to utilize relatively small plates for the production of composite photographs of considerable size.

Further advantages of the invention will be set forth in the detailed description which follows.

In the accompanying drawing,

Fig. 1 is a view, partly in side elevation and partly in section, of a camera, constructed in accordance with the invention, Fig. 2 is a front elevation of said camera. and Fig. 3 is a rear elevation of the device.

Like numerals designate corresponding parts in all of the figures of the drawing.

In the drawing, 5 designates the legs of a supporting tripod or stand, which comprises a substantially horizontal member 6, carrying a level 7. The camera proper comprises a bellows 8, of conventional type, the front end of which is connected to a rigid board, or plate 9, which constitutes the carrying element of the lens holder 10. Brackets 11, fixed to the opposite sides of the plate 9, are pivotally engaged at 12, on the arms 13 of a forked element 14. This forked element is mounted to turn about a vertical axis, in a socketed element 15, of the supporting frame. Telescopic members, which may consist of rods 16, and sleeves 17, in which said rods slide, establish connection between the brackets 11 and brackets 18, the latter being secured to a rigid frame 19, constituting the rear end of the camera, and to which the rear end of the bellows is connected, in a usual and known way, and in which sensitive members, such as the photographic plates, for example, are to be placed, in the use of the camera.

The brackets 18, only one of which is shown, comprise slides 19', which are mounted for vertical sliding movement upon guide rods 20. Additional guides 21, carried by the frame 19, may be employed to add to the general steadiness of the structure. The slides 19' carry binding screws 22, by which they may be bound against movement, with respect to the rods 20. The lower ends of the rods 20 are hingedly connected at 23 to sleeves 24, the latter being slidably mounted upon rods 25, which project rearwardly from a plate 26. The forked element 14 is carried by this plate, and said element constitutes a pivotal mounting for said plate, in the vertical extension 15, of the frame. The pivots 12 coincide with the optical center of the lens 27, of the camera, while the axis of the forked element 14 coincides with the optical center of said lens. While the foregoing arrangement is the preferred and desirable one, and the one which will give the best results, it is a fact that some measure of success may be achieved even though the horizontal and vertical movements be about centers, slightly off of the optical center of the lens. The feature which renders the camera of great utility, and which is wholly novel over the prior art, is the provision of the camera of the character described, mounted to permit the sensitized material to be moved both vertically and horizontally with respect to the lens, while maintaining the said sensitized material in the same plane throughout the several exposures, in the same vertical plane. This is what yields the important technical results in the making of very large photographs in section. An anti-friction bearing 28, such as a ball bearing, wheel, roller, or the like, is carried by the underside of the plate 26, and travels upon the horizontal member 6, of the supporting frame. If desired, a wear plate 29 may be provided for said anti-friction bearing, to travel upon. From the foregoing description, it will be apparent that the camera may be swung bodily in a horizontal plane, about the pivot constituted by the forked element 14, to take a plurality of pictures of a given view in the same horizontal plane, and if the camera is moved the right distance these photographs may be so taken that they can be matched, at their edges, to make a composite picture that would be much larger than the plate, or other sensitive element, carried by the camera. In order that it may be accurately determined just how much the camera has been moved, we provide an indicating means, such as a graduated plate 30, upon the frame, and an indicating finger 31, upon some of the parts that move with the camera.

In like manner, a plurality of pictures, of a given view, in the same vertical plane, may be secured by moving the rear end of the camera vertically upon the guide rods 20, the camera then swinging about the pivots 12, and being held in adjusted position by binding screws 22. To determine the extent to which the camera has been moved in taking the several views in the same vertical plane, the rods 20 may be graduated, as indicated at 32, and by moving the camera just the proper distance, the meeting edges of the photographs may be caused to match. It is clear that, by taking full advantage of the capabilities of movement of the camera, in both vertical and horizontal directions, a considerable number of separate photographs, adapted to match at their meeting edges, may be secured.

The slides, constituted by the sleeves 24, permit adjustment of the bellows 8, in the usual and known way to accommodate lenses of different focal lengths. Telescopic braces, which may comprise rods 33, sleeves 34 and binding screws 35 are pivotally connected at 12 and 36 on the brackets 11, and the rods 20, respectively; said braces holding the rods 20 in position after they have been adjusted, and lending proper rigidity to the whole structure, in use.

In taking a plurality of photographs of objects in the same vertical plane, and where all of said objects lie directly above or below each other, the rods 20 are adjusted to vertical position, but where the objects to be represented upon the several different photographs do not lie directly above or below each other as, for example, in a general landscape view, the rods 20 may be tilted, the result being to give the same effect upon the several negatives, making up the composite picture, that the swing back of an ordinary camera would give upon a single negative. It will be observed that the connections provided by the members 16 and 17 serve the important function of maintaining the center of the focusing screen coincident with the projected axis of the camera lens throughout the several adjustments of the camera while, at the same time, it permits adjustment of the sensitized material toward and from the lens in the usual and well known way.

It is to be understood that the invention is not limited to the precise construction illustrated and described. The construction shown in the drawing is one which we have found to be advantageous, but it is clear that many ways will readily suggest themselves to the skilled designer of cameras, for mounting the camera to secure the desired results. Consequently, it is to be understood that the invention includes within its purview whatever changes fairly come within either the terms or the spirit of the appended claims.

Having described our invention, what we claim is:

1. The combination with a support, a camera, and means for mounting the camera upon the support for tilting movement in a vertical plane, and for swinging movement in a horizontal plane, both of said movements being about axes coincident with the optical center of the camera lens, and means for maintaining the sensitized material in the camera in the same plane throughout the several exposures in the same vertical plane.

2. The combination with a support, a camera, and means for mounting the camera upon the support for tilting movement in a vertical plane, and for swinging movement in a horizontal plane, both of said movements being about axes coincident with the optical center of the camera lens, means for maintaining the sensitized material in the camera in the same plane throughout the several exposures in the same vertical plane, and means for maintaining the center of the focusing screen coincident with the projected axis of the camera lens throughout the several adjustments of the camera.

3. The combination with a support, of a camera, means for mounting the camera upon the support for tilting movement in a vertical plane, and for swinging movement in a horizontal plane, both of said movements being about axes coincident with the optical center of the camera lens, upstanding guide members adjustable to varying positions of angularity, and means for adjusting the rear portion of the camera to a plurality of positions in the same vertical plane and along said guide members, whereby a uniform swing-back effect is produced upon all of the sections of the composite photograph to be produced.

4. The combination with a support, of a camera comprising front and rear rigid members, and an interposed bellows, a member mounted to turn upon the support, about a vertical axis, coincident with the optical center of the lens to which the front rigid member of the camera is connected by a substantially horizontal pivot, and means for mounting the rear rigid member of the camera for adjustment to a plurality of different positions, and for maintaining the said rigid member in the same plane throughout the several exposures in the same vertical plane.

5. The combination with a support, of a camera comprising front and rear rigid members, and an interposed bellows, a member mounted to turn upon the support, about a vertical axis, to which the front rigid member of the camera is connected by a substantially horizontal pivot, means for mounting the rear rigid member of the camera for adjustment to a plurality of different positions in a vertical plane, while being maintained in the same plane throughout such adjustments, and means for mounting the camera to swing bodily in a horizontal plane, througout the several vertical positions thereof and about the center constituted by the member to which the front rigid member of the camera is pivoted.

6. The combination with a support, of a spider pivoted for swinging movement in a substantially horizontal plane upon said support and carrying substantially horizontal rearwardly projecting rods, a camera comprising rigid front and rear elements, rods hingedly connected to the first named rods, brackets carried by the rear rigid element of the camera, and slidably engaged with the last named rods, means for binding said brackets against movement with respect to the rods, and an upstanding member, the axis of which is coincident with the pivot point of the spider, said upstanding member having a forked upper end within which the front rigid element of the camera is pivoted upon an axis coincident with the optical center of the camera lens.

7. The combination with a support, a camera, and means for mounting the camera upon the support for tilting movement in a vertical plane, and for swinging movement in a horizontal plane, both of said movements being about axes coincident with the optical center of the camera lens, means for maintaining the sensitized material in the camera in the same plane throughout the several exposures in the same vertical plane, and means for adjusting the sensitized material toward and from the lens to effect a focusing of the image thereon.

8. The combination with a support, a camera, means for mounting the camera upon the support for tilting movement in a vertical plane and for swinging movement in a horizontal plane, both of said movements being about axes coincident with the optical center of the camera lens, means for maintaining the sensitized material in the camera in the same plane throughout the several exposures in the same vertical plane, and slidable connections between the front and rear portions of the camera which cause the front and rear portions to move in unison in its tilting movement in a vertical plane while permitting movement of the sensitized material toward and from the lens to effect focusing of the image thereon.

9. The combination with a camera, comprising a lens at the forward end thereof, and a carrier for sensitized material at the rear end thereof, of a support, means for pivotally mounting the forward end of the camera with relation to the support and adjacent the lens for tilting movement in the vertical plane and for swinging movement in a horizontal plane, and means for maintaining the sensitized material in the camera in the same plane throughout the several exposures in the same vertical plane.

In testimony whereof we affix our signatures.

LORING W. BEESON.
JOHN A. BEESON.